(12) United States Patent
Saito

(10) Patent No.: US 6,598,070 B1
(45) Date of Patent: Jul. 22, 2003

(54) DATA SENDING/RECEIVING SYSTEM, DATA RECEIVING DEVICE, AND DATA RECEIVING METHOD BASED ON GENERATING A TEMPORARY FILE-NAME AND TEMPORARY FILE-SIZE ACCORDING TO A POSITION INFORMATION BEFORE STORING ON THE RECEIVING SIDE

(75) Inventor: Shigeru Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/447,552

(22) Filed: Nov. 23, 1999

(30) Foreign Application Priority Data

Nov. 24, 1998 (JP) ............................................. 10/332453

(51) Int. Cl.[7] .............................................. G06F 15/15
(52) U.S. Cl. ........................ 709/200; 709/202; 709/227; 709/228; 709/232; 709/234; 709/238; 709/245; 370/384; 370/392; 370/409
(58) Field of Search ................................ 709/200–203, 709/223–224, 227–228, 232, 234, 238, 245–246; 370/389–392, 409–410, 440

(56) References Cited

U.S. PATENT DOCUMENTS 5,572,678 A * 11/1996 Homma et al. ............. 709/227
5,617,424 A * 4/1997 Murayama et al. ......... 709/245
5,903,724 A * 5/1999 Takamoto et al. .......... 709/200

FOREIGN PATENT DOCUMENTS

| JP | 62-013796 | 1/1987 | ........... F04D/19/04 |
| JP | 04-207430 | 7/1992 | ........... H04L/12/40 |
| JP | 05-056079 | 3/1993 | ........... H04L/12/56 |
| JP | 06-291780 | 10/1994 | ........... H04L/12/56 |
| WO | WO 97/00563 | 1/1997 | ............ H04H/1/02 |

OTHER PUBLICATIONS

Japanese Office Action, dated Jun. 12, 2001, with English language translation of Japanese Examiner's comments.

* cited by examiner

Primary Examiner—Bharat Barot
(74) Attorney, Agent, or Firm—Whitham, Curtis & Christofferson, P.C.

(57) ABSTRACT

A data sending/receiving system, data receiving device and data receiving method enable technique of efficient data; reception to be provided in such a way that even though when the system receives data whose file-name, file-size and so forth are unknown, the system determines temporary file-name and/or file-size with possible bounds, before implementing storing processing. A sending device converts file to be sent into packet data, and adds identification information of the file and position information of the packet data in relation to the file to respective packets. A receiving device generates a temporary file-name and a temporary file-size according to an identification information, before storing packet data associated with the temporary file-name in storage device.

80 Claims, 11 Drawing Sheets

FIG. 1

| 41 | PROGRAM A | | | |
|---|---|---|---|---|
| | 1 | aaa.txt | ¥ | 100 |
| | 2 | bbb.exe | ¥Dir1 | 1000 |
| | 3 | ccc.html | ¥Dir2 | 500 |
| | ⋮ | ⋮ | ⋮ | ⋮ |
| | n | 0101.dll | ¥Dir1¥Dir11 | 2500 |
| | 42 | 43 | 44 | 45 |

FIG. 2

| 1-1 | aaa.txt | ¥ | 100 | · · · |
|---|---|---|---|---|
| 2-1 | bbb.exe | ¥Dir1 | 1000 | · · · |
| 51 | 52 | 53 | 54 | 55 |

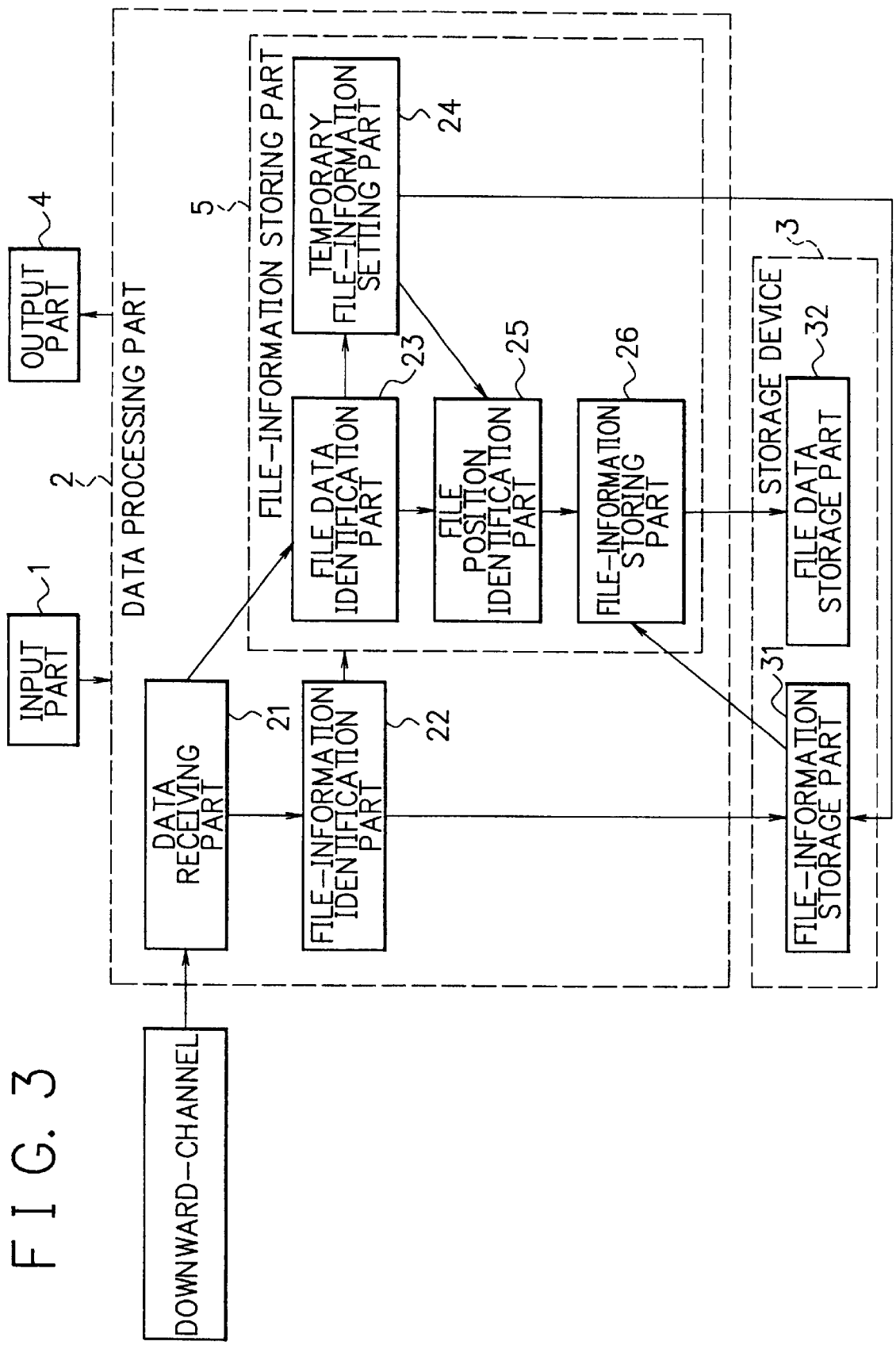
F I G. 3

FIG. 5

| | 331 | 332 | |
|---|---|---|---|
| 131 → | 1-1 | • • • | ← 231 |
| | 1-2 | • • • | |
| | 1-3 | • • • | |
| | 2-1 | • • • | |
| 132 → | 2-2 | • • • | ← 232 |
| | | | |
| | n-1 | • • • | |
| | | | |
| | n-m | • • • | |

FIG. 6

| FILE INFORMATION RECEIVED ? | FILE-NAME | FILE-SIZE | REMAINING FILE-SIZE |
|---|---|---|---|
| 1 | FILE 1 | 150 | 0 |
| 0 | TEMPORARY FILE NAME A | 500 | 350 |
| 1 | FILE 3 | 1000 | 100 |
| 0 | TEMPORARY FILE NAME B | 1500 | 1200 |
| 62 | 63 | 64 | 65 |

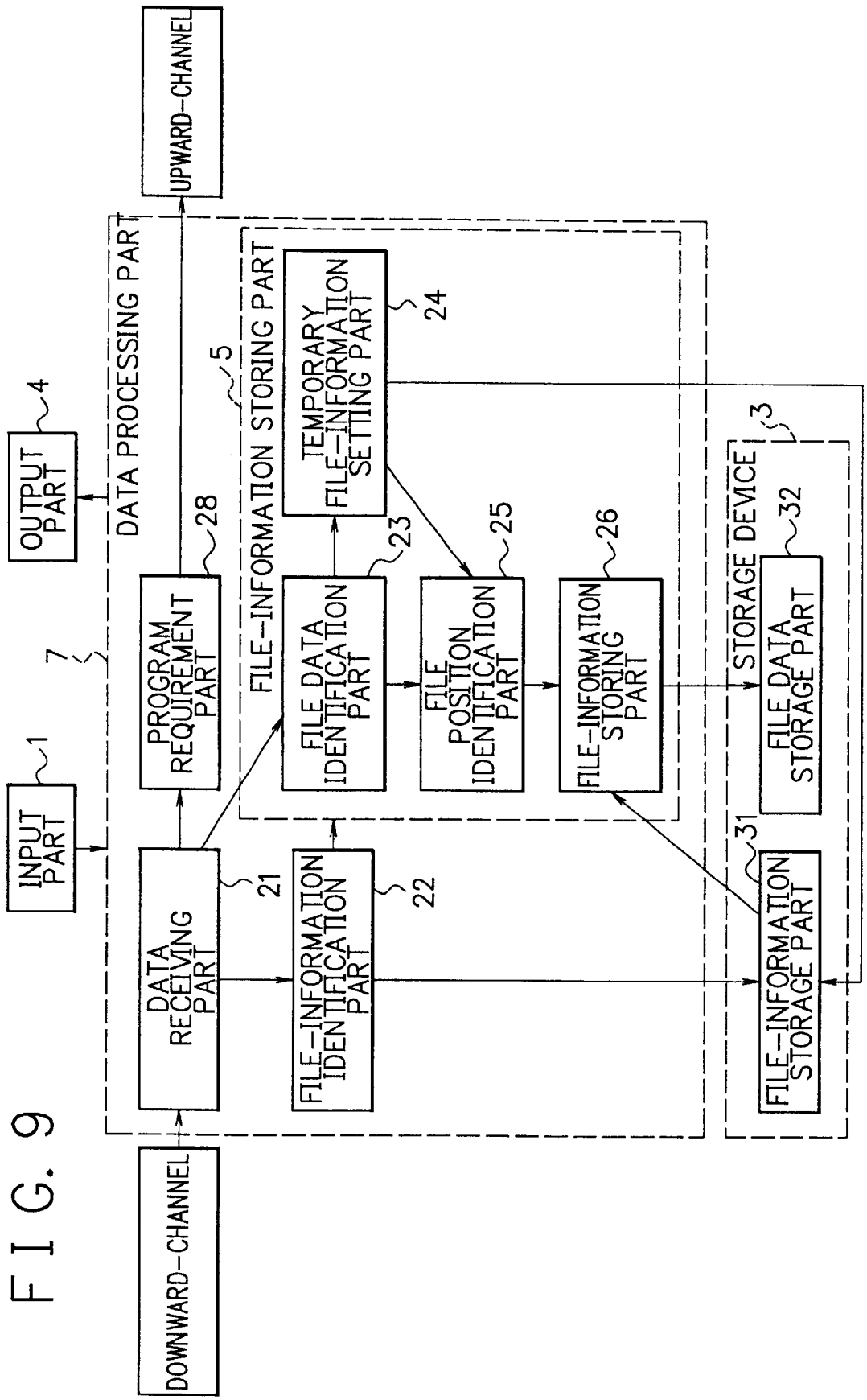
F I G. 9

DATA SENDING/RECEIVING SYSTEM, DATA RECEIVING DEVICE, AND DATA RECEIVING METHOD BASED ON GENERATING A TEMPORARY FILE-NAME AND TEMPORARY FILE-SIZE ACCORDING TO A POSITION INFORMATION BEFORE STORING ON THE RECEIVING SIDE

BACKGROUND OF THE INVENTION

The present invention relates to a technical system, technical device and technical method of data reception in communication system which employs an internet, a television, a CATV (cable television, community antenna television), a communication satellite and so forth.

1. Description of the Prior Art

Currently, in the communication system, which utilizes an internet, a television, a CATV, a communication satellite, and so forth, data sending is implemented from a data sending device (or a broadcasting station) toward a data receiving device (or a picture and/or speech sound receiving device).

In this communication system, which utilizes an internet, a television, a CATV, a communication satellite, and so forth, sending route for sending data from a data sending device (or a broadcasting station) toward a data receiving device (or a picture and/or speech sound receiving device) is defined as a downward-channel. Further, to the contrary, sending route for sending data from data receiving device (or a picture and/or speech sound receiving device) toward a data sending device (or a broadcasting station) is defined as an upward-channel.

A file is included in the data which is sent and/or received as data. When the file is sent, both of an information concerning the file (hereinafter referred to as file-information) and the file itself are sent through the downward-channel.

The file-information consists of a file-name, a storing directory-name, a file-size and so forth.

Here, the file-information is explained referring to FIGS. 1 and 2. FIG. 1 is a format in which a plurality of file-information represented using table system, indicates data when the plurality of file-information are sent as independent data.

Further, in FIG. 1, lateral one line (row) indicates file-information in one file.

In FIG. 1, reference numeral 41 is a program-name. The program-name 41 indicates name of a program. Here, the program consists of a plurality of files. The program indicates a completed meaningful unit. For instance, the program consists of a file of related picture information, a file of speech sound information, and a file of character information.

A reference numeral 42 is identification string. The identification string 42 is a string indicating information for identifying respective files.

A reference numeral 43 is a name string. The name string 43 is a string indicating file-name of respective files.

A reference numeral 44 is also a name string. The name string 44 is a string indicating directory name of respective files.

A reference numeral 45 is a size string. The size string 45 is a string indicating file-size of respective files.

Data of the file-information as shown in FIG. 1 consists of n-pieces of file-information from "a a a. txt." to "0101.d11", and this data is sent (broadcasted) frm the data sending device (or broadcasting station) as independent data through the downward-channel.

Next, referring to FIG. 2, FIG. 2 is a view showing data in the case where file-information is added to an initial data consisting of respective files to be sent.

Further, in FIG. 2, a row (lateral one line) indicates one data which is sent.

In FIG. 2, a reference numeral 51 is an information string. The information string 51 is a string indicating identification information for identifying respective data.

A reference numeral 52 is a name string. The name string 52 is a string indicating file-name of respective files.

A reference numeral 53 is a name string. The name string 53 is a string indicating directory name of respective files.

A reference numeral 54 is a size string. The size string 54 is a string indicating file-size of respective files.

A reference numeral 55 is a data string. The data string 55 is a string indicating a first data within divided respective files.

In the case of FIG. 2, the file sent from the data sending device (or broadcasting station) is divided into a plurality of data. The file-information is added to the first data within the plurality of data which are divided, thus the first data with file-information is sent (broadcasted) through the downward-channel.

A conventional data receiving device receives data of these file-information, subsequently, causing the file-name and the file-size to be proved, before, storing processing is implemented when the data of the file-name is received.

Namely, when data whose file-information is not received is received, the received data is discarded without performing storing processing.

However, in the conventional technique, there are following problems. The first problem is that effective data which should be subjected to the storing processing essentially is dealt with as invalid data, because the file-information can not be obtained until the file-name and the file-size are proved, meanwhile received whole data is discarded as invalid data.

The second problem is that in sole cases, a process of receiving of the data takes time because the discarded data is necessary to be received again.

SUMMARY OF THE INVENTION

In view of the foregoing, it is an object of the present invention, in order to overcome the above-mentioned problems to provide a data sending-receiving system, a data receiving device, and data receiving method in which even though when a receiving device receives data whose file-name and file-size are unknown, the receiving device settles temporary file-name and temporary file-size, then, implementing storing processing so that it is capable of providing efficient technique of data reception.

According to a first aspect of the present invention, in order to achieve the above-mentioned object, there is provided a data sending/receiving system which comprises a data sending device including a means which causes a sent file to be converted into packet data, before adding file identification information to every respective packets in order to identify the file, and a data receiving device including a storage means, a means for generating temporary file-information according to the file identification information, and a means for storing the packet data in the storage means associated with the temporary file-information.

According to a second aspect of the present invention, in the first aspect, there is provided a data sending/receiving system, wherein the data sending device further includes a means for adding position information indicating a position in relation to the file of the packet data in every respective packets, and the data receiving device further includes a means;l for generating temporary file-size according to the position information before adding the temporary file-size to the temporary file-information.

According to a third aspect of the present invention, there is provided a data receiving device in which when the data sending device converts file to be sent into packet data, file identification information of the file is added to respective packet, before the data receiving device receives packet data sent through downward-channel, which data receiving device comprises a storage device, a means for generating temporary file-information according to the file identification information, and a means for causing the packet data to be stored in the storage device associated with temporary file-information.

According to a fourth aspect of the present invention, in the third aspect, there is provided a data sending device, wherein when file is converted into packet data, further, position information in relation to the file of the packet data is added, the data receiving device includes a means for generating temporary file-size according to the position information, and for adding the file-size to the temporary file-information.

According to a fifth aspect of the present invention, there is provided a data receiving device in which when a data sending device converts a file to send into a packet data, the data sending device adds file-information regarding the file to any of packets, and the data receiving device receives the packet data to which file identification information for identifying the file and position information of the packet data in relation to the file in every respective packets exception for the file-information regarding the file to be sent through downward-channel, which the data receiving device comprises a storage device, a data receiving means for receiving data through the downward-channel, a file-information identification means which judges whether or not the file-information of data is received, outputting non-reception information of file-information indicating that there is no file-information when the file-information is not received in the result of the above judgement, and a file-information storing means in which when the file-information storing means receives the file-information non-reception information, the file-information storing means generates temporary file-information according to the file identification information and generates temporary, file-size according to the position information, before securing storage area for storing the data in the storage device based on the temporary file-size, thus causing the data to be stored in the storage device associated with the temporary file-information.

According to a sixth aspect of the present invention, in the fifth aspect, there is provided a data receiving device, wherein the data receiving device further includes input means.

According to a seventh aspect of the present invention, in the fifth or the sixth aspect, there is provided a data receiving device, wherein the data receiving device further includes output means.

According to an eighth aspect of the present invention, in any of the fifth to seventh aspects, there is provided a data receiving device, wherein the file-information storing means comprises a temporary file-information setting means for generating temporary file-information consisting of a temporary file-name of the data, and a temporary file-size according to file identification information and position information of data received in data receiving means, a file data identification means for generating storing objective file identification information which indicates identification of file to be written the data in the storage device according to the data and the temporary file-information, a file position identification means for generating file position information indicating information of the position in relation to file for writing the data into the storage device according to the position information of the data, and a file data storing means for storing the data in the storing means according to the temporary file identification information, the storing objective file identification information, and the file position information.

According to a ninth aspect of the present invention, in any of the fifth aspect to the eighth aspects, there is provided a data receiving device, wherein the storage device comprises a file-information storage means for storing therein file-information consisting of information of file-name, information of directory-name, and information of file-size, and a file data storage means for causing necessary data for a file in which the data is restored to its original state to be stored as a file from the data received by the data receiving means.

According to tenth aspect of the present invention, in any of the fifth to the ninth aspects, there is provided a data receiving device, wherein a program to be sent consists of file whose number is one or more than two, and the data receiving device further comprises a program identification means which judges whether or not data received by the data receiving means is data converted into packet data from file consisting of required program, under the result of the judgement, when the data is not data which is converted into the packet data from the file consisting of the required program, the program identification means discards the data.

According to an eleventh aspect of the present invention, in any of the fifth to the tenth aspects, there is provided a data receiving device, wherein a program to be sent consists of file whose number is one or more than two, and the data receiving means further comprises a program requirement means for sending information of the program required through the input means to a sending device.

According to a twelfth aspect of the present invention, in any of the fifth to the eleventh aspects, there is provided a data receiving device, wherein the data receiving device further comprises a file-information display means which causes information of receiving status to be displayed when the data receiving device causes data received by the data receiving means to be stored in the storage device.

According to a thirteenth aspect of the present invention, in any of the fifth to twelfth aspects, there is provided a data receiving device, wherein the data receiving device has a storage medium recorded therein a program which causes the data receiving device to function as the data receiving means, the file-information identification means, and/or the file-information storing means.

According to a fourteenth aspect of the present invention, there is provided a data receiving method in which when the data receiving method converts a file to send into a packet data, the data receiving method adds file-information regarding said file to any of packets, and the data receiving method receives the packet data to which file identification information for identifying the file and position information of the packet data in relation to the file in every respective packets exception for the file-information regarding the file to be sent through downward-channel, which data receiving method comprises the steps of a step for generating temporary file-information based on the file identification information which is added individually to respective packets when it is incapable of acquiring the file-information on the occasion of reception of the data, and a step for storing received data based on the temporary file-information.

According to a data receiving method, in the fourteenth aspect, wherein a program to be sent consists of file whose number is one or more than two, and the data receiving method further comprises a step for discarding the data when received data is not data of file consisting of required program.

According to a sixteenth aspect of the present invention, in the fourteenth or the fifteenth aspect, there is provided a data receiving method, wherein a program to be sent consists of file whose number is one or more than two, and the data receiving method further comprise s the steps of a step into which required program is inputted, and a step for sending information of the program inputted therein to sending device.

According to a seventeenth aspect of the present invention, in any of the fourteenth to the sixteenth aspects, there is provided a data receiving method, wherein the data receiving method further comprises the steps of a step for storing therein data received by data receiving process, and a step for causing information of the receiving status to be outputted to be displayed.

The above and further objects and novel features of the invention will be more fully understood from the following detailed description when the same is read in connection with accompanying drawing. It should be expressly understood, however, that the drawings are for purpose of illustration only and are not intended as a definition of the limits of the invention.

BRIEF DESCRIPTION OF THE DRAWINGS

FIG. 1 is a view showing data when a plurality of file-information which is indicated by using format of table system in the conventional technique are sent as independent data;

FIG. 2 is a view showing data when the file-information in the conventional technique is added to the first data constituting respective files to be sent;

FIG. 3 is a view showing a configuration of a first embodiment;

FIG. 5 is view showing a table representing packet data which is obtained in such a way that a plurality of files of the first embodiment according to the present invention is divided into the packet data;

FIG. 6 is a view showing data base of file-name and file-size stored in file-information storage part of the first embodiment according to the present invention;

FIG. 9 is a view showing configuration of a third embodiment according to the present invention;

DETAILED DESCRIPTION OF THE PREFERRED EMBODIMENTS

Figure 4:
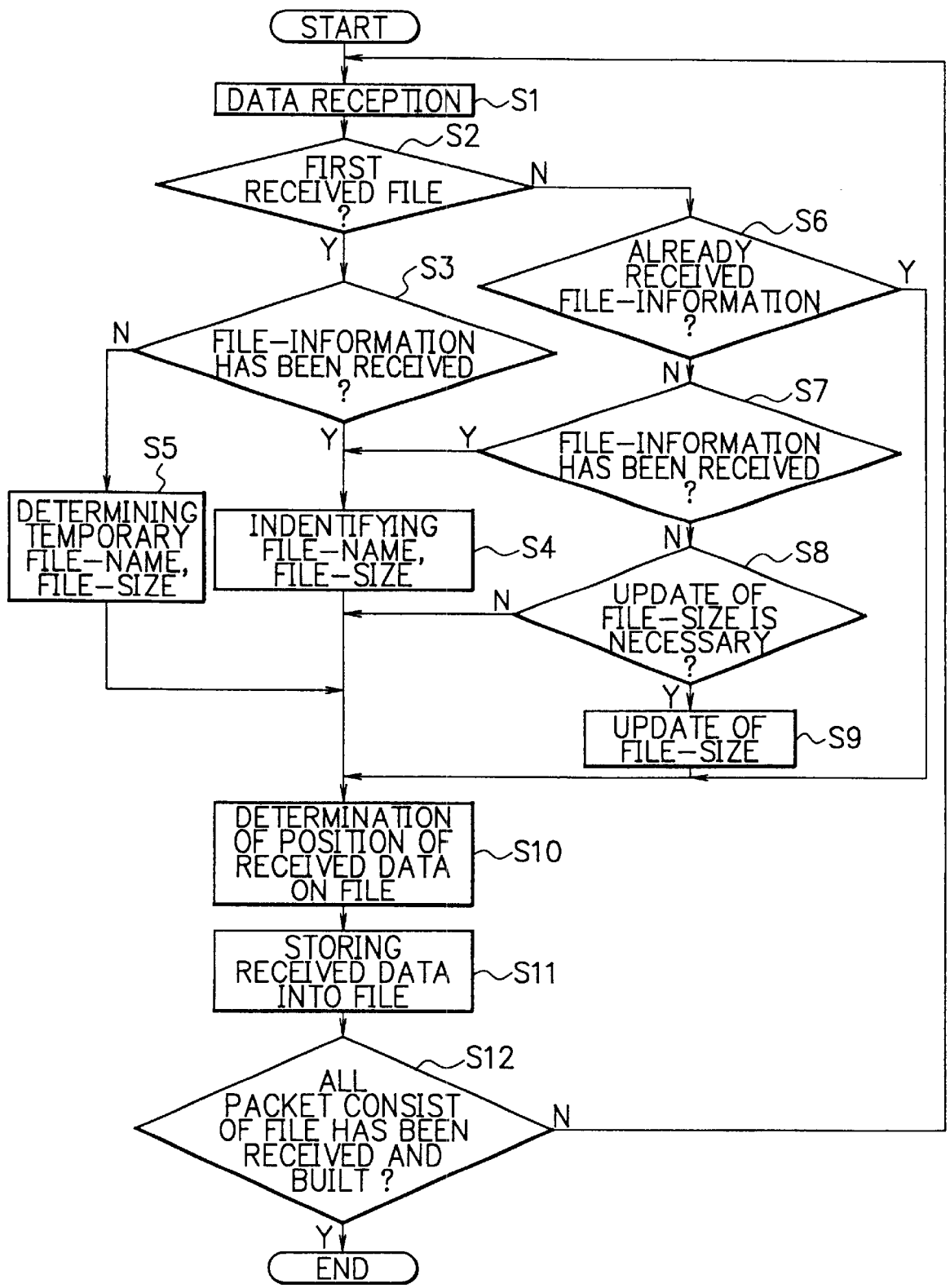
FIG. 4 is a flow chart showing operation of the first embodiment according to the present invention.

A preferred embodiment of the present invention will be described in detail in accordance with the accompanying drawings. FIG. 3 is a view showing a configuration of the first embodiment according to the present invention. In FIG. 3, a reference. numeral 1 is an input part. The input part 1 consists of for instance, a keyboard and a mouse.

A reference numeral 2 is a data processing part. The data processing part 2 consists of a file-information storing part 5 described later, a data receiving part 21, and file-information identification part 22. Further, in the embodiment of the present invention, the data processing part 2 works due to program control.

A reference numeral 3 is a storage device. The storage device 3 consists of a file-information storage part 31 described later, and a file data storage part 32. The storage device 3 stores therein received file-information and/or file data.

A reference numeral 4 is an output part. The output part 4 is for instance, an output device such as a display, a printer and so forth.

A reference numeral 5 is a file-information storing part. The file-information storing part 5 consists of a file data identification part 23, a temporary file-information setting part 24, file position identification part 25, and a file data storing part 26.

A reference numeral 21 is a data receiving part. The data receiving part 21 which has a communication means receives data sent (broadcasted) from the data sending device (or broadcasting station) through the communication means and the downward-channel.

A reference numeral 22 is a file-information identification part. The file-information identification part 22 identifies the file-information such as file-name of the data to be received and/or file-size from the data received by the data receiving part 21.

A reference numeral 23 is a file data identification part. The file data identification part 23 identifies a file data which should be written using both of data received due to the data receiving part 21 and the file-information received in the file-information identification part 22.

A reference numeral 24 is a temporary file-information setting part. The temporary file-information setting part 24 sets temporary file-name and/or temporary file-size when reception data sent to the file data identification part 23 does not receive a file-information yet.

A reference numeral 25 is a file position identification part. The file position identification part 25 identifies that the reception data corresponds to which part of the file using file-information received from the file-information identification part 22 or the temporary file-information; setting part 24.

A reference numeral 26 is a file data storing part. The file data storing part 26 writes the receiving data into the storage device 3. A storing place on that occasion is position of the file received in the file position identification part 25.

A reference numeral 31 is a file-information storage part. The file-information storage device 31 stores therein file-information which is necessary for writing individual file into a file data storage part 32 describing later, after receiving the individual data such as the file-name of the file which should be received, a storing objective directory name, file-size and so forth.

A reference numeral 32 is a file data storage part. The file data storage part 32 stores therein content of the data which is received actually as a file.

Next, there will be described in detail about operation of the first embodiment.

Data of the file sent (broadcasted) from the data sending device (or the broadcasting station) consists of file-information which is information concerning the file itself, and data of file itself. The file-information consists of a file-name, a storing directory name, a file-size and so forth.

Further, the file sent (broadcasted) from the data sending device (or the broadcasting station) is divided. The divided data is converted into packed data which is group of some data while adding information concerning the divided data to the divided data.

Namely, the packet data consists of a packet itself information to be data which the file itself is divided, and a packet identification information to be information (including information indicating identification of packet data) concerning the divided data. Further, the packet identification information consists of the file identification information indicating identification of the original file before dividing into the packet data and position information indicating that the packet data exists which position (order) in the original file before dividing into the packet data.

Figure 5:
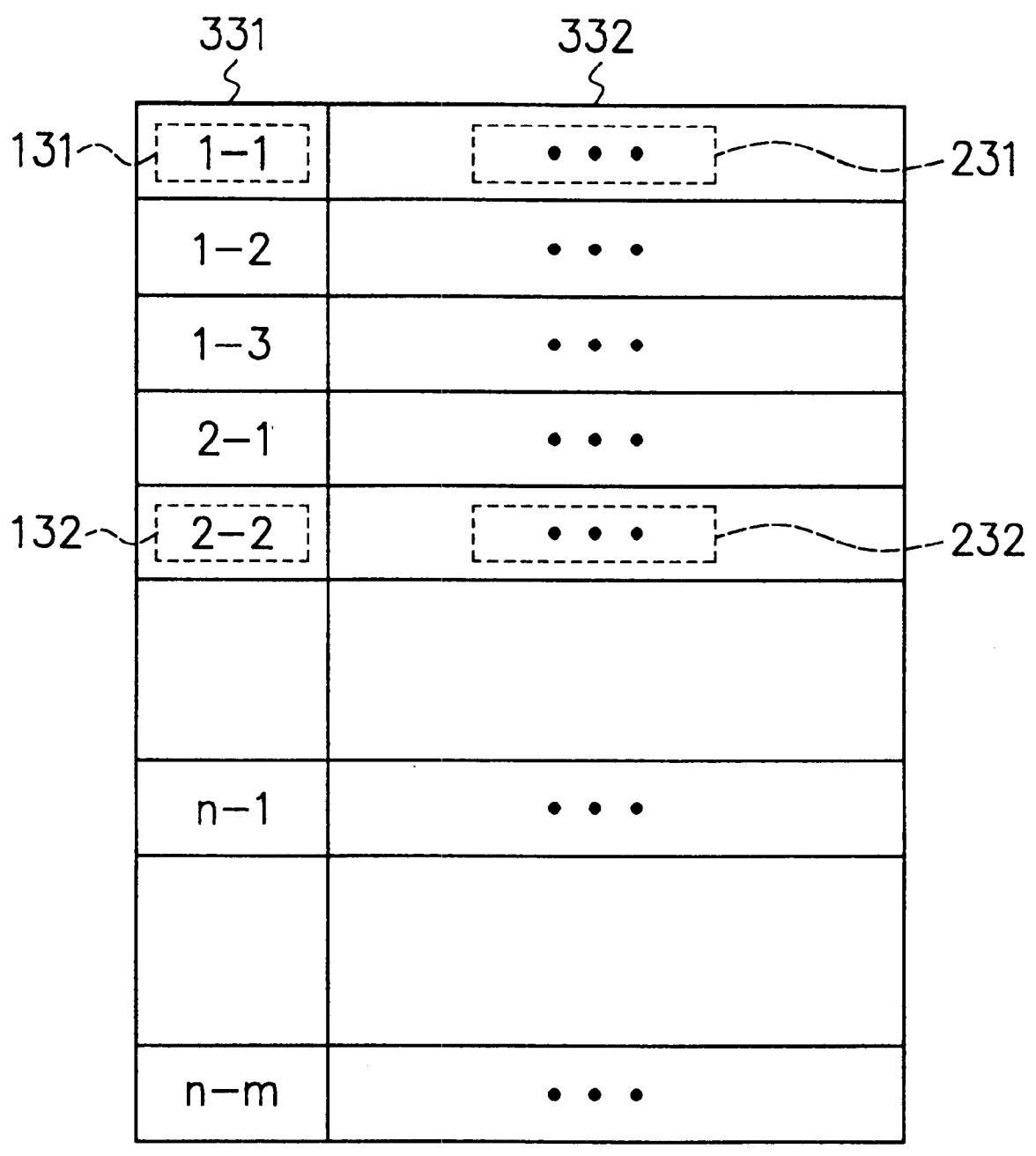

There will be described a configuration of the packet data in the first embodiment referring to FIG. 5. FIG. 5 is a view showing a table in which a plurality of files are divided into packet data to indicate therein.

In FIG. 5, one row denotes one packet data.

In FIG. 5, a reference numeral 331 is a string of packet identification information. The string of the packet identification information 331 denotes packet identification information of the respective packet data.

A reference numeral 332 is a string of packet-itself information. The packet-itself information 332 denotes packet-itself information of respective packet data.

Reference numerals 131, and 132 are packet identification information. The packet identification information 131, and 132 consist of file identification information and position information. For instance, on the supposition that the packet identification information is format of "n-m". Here, on the supposition that "n" is file identification information. Further, on the supposition that "m" is position information. Thus, the packet identification information 131 is "1-1", therefore, original file-name of the packet data is "file 1", and position (order) of the packet data in the original file is "1". Furthermore, the packet identification information 132 is "2-2", therefore original file-name of the packet data is "file 2", and position (order) of the packet data in the original file is "2".

Reference numerals 231, and 232 are packet-itself information. The packet-itself information 231 is a packet-itself information which is data-itself of the packet data corresponding to the packet identification information 131. Further, the packet-itself information 232 is a packet-itself information which is data-itself of the packet data corresponding to the packet identification information 132.

The data sending device (or the broadcasting station) causes the packet data to be sent (broadcasted) successively through the downward-channel using the internet, the television, the CATV, and/or the communication satellite. Further, since a plurality of files may be sent, packet data concerning the plurality of files is flowing successively in the downward-channel.

Next, operation of the first embodiment will be described in detail referring to FIG. 4.

FIG. 4 is a flowchart showing operation of the first embodiment.

Firstly, the data receiving part 21 receives the packet data from the downward-channel (STEP S1). Then the packet data (hereinafter referred to as packet data "a") received by the data receiving part 21 is sent to the file-information identification part 22 subsequently.

The file-information identification part 22 receives the packet data "a". The file-information identification part 22 judges whether or not the packet data "a" is the packet data which is received firstly among the original files (file which is divided to be generated into the packet data "a") of the packet data "a" according both to packet identification information of the packet data "a" and the packet data received previously (STEP S2).

Result of the judgement, when the packet data "a" is the packet data "a" which is received in the first place among the original files of the packet data "a", the file-information identification part 22 judges whether or not it is capable of obtaining file-information concerning the original files of the packet data "a" (STEP S3).

When it is capable of obtaining the file-information, the file-information identification part 22 causes the file-information consisting of the file-name, the storing directory name and the file-size to be stored in the file-information storage part 31 according to the file-information. On this occasion, when the temporary file-name and/or temporary file-size is stored in the file-information storage part 31, the file-information identification part 22 corrects respective temporary data (renewal) to be stored in the file-information storage part 31. Then, the file-information identification part 22 sends data which is necessary for constituting a file toward the file data identification part 23 from the packet data "a". The file data identification part 23 receives data which is necessary for constituting the file from the packet data "a", before sending the data to the file position identification part 25 (STEP S4).

On the other hand, when the file-information can not be obtained, the file-information identification part 22 generates file-information non-received information indicating that there is no file-information. Then, the file-information identification part 22 causes the file-information non-received information and the packet data "a" to be sent to the file data identification part 23. The file data identification part 23 receives the file-information non-received information and the packet data "a", before sending the packet data "a" to a temporary file-information setting part 24.

The temporary information setting part 24 receives the packet data "a", before generating temporary file-name and temporary file-size in terms of the packet data "a". The temporary file-name is a peculiar file-name capable of being identified to another file-name using file identification: information and so forth. For instance, on the supposition that file identification information is "A", thus temporary file-name is named as temporary file-name "A".

Further, temporary file-size is set according to position information of the packet data. For instance, temporary file-size is set in such a way that size of the packet data itself is multiplied by value of position (order) of the packet data according to the position information of the packet data.

Concretely, on the supposition that the packet data is 128 bites and the position (order) is "3" (three), temporary file-size is set as being 384 bites. When it is capable of taking file-size largely, temporary file-size is set value which is further multiplied by the coefficient of safety.

Or, temporary file-size is set in such a way that size of the packet data itself is multiplied by value of position (order) of the packet data according to the position information of the packet data, before the size is set in such a value as a good size to leave off. Concretely, on the supposition that the packet data is 53 bytes and position (order) is "7" (seven), thus multiplied value becomes 371 bytes. Thus, file-size is set to 500 bytes which is a good size to leave off. When it is capable taking file-size largely, temporary file-size is set to a value which is further multiplied by the coefficient of safety, and then making a file-size a good value to leave off.

Then, the temporary file-information setting part 24 causes information and so forth indicating whether or not temporary file-name, temporary file-size and file-information are received to be stored in the file-information storage part 31 (STEP S5).

Here, there will be explained about data base; of file-name and file-size stored in the file-information storage part 31.

Referring to FIG. 6, FIG. 6 is a view showing data base of file-name and file-size stored in the file-information storage part 31. In FIG. 6, a reference numeral 62 is reception information string. The reception information string 62 is a string stored therein information indication whether or not the file-information is capable of being received. For instance, when the file-information is capable of being received, "○" is stored. Further, when the file-information is incapable of being received, "X " is stored.

A reference numeral 63 is file-name string. The file-name string 63 is a string storing therein file-name.

A reference numeral 64 is a size string. The size string 64 is a string in which file-size of the whole file is stored.

A reference numeral 65 is a size string. The size string 65 is a string in which remaining file-size which is obtained in such a way that received data size is subtracted from file-size of the whole file is stored.

As described above, the file-information storage part 31 stores therein file-information represented by table system shown in FIG. 6. Thus, it is capable of differentiating a file capable of acquiring file-information from a file incapable of acquiring file-information according to the reception information string 62.

Next, the temporary file-information setting part 24 causes the packet data "a" to be sent to a file position identification part 25.

The file position identification part 25 which receives the packet data "a" determines position (order) of the packet data "a" on the file based on position information existing in the packet identification information of the packet data "a" (STEP S10).

Next, the file position identification part 25 causes the packet data "a" to be sent to a file data storing part 26. Then, the file data storing part 26 which receives the packet data "a" causing the packet data "a" (packet-itself information) to be written file data storage means 32 (STEP S11).

The processing described above is repeated until the file is generated to be completed (STEP S12).

Further, in the above described STEP S2, the file-information identification part 22 judges whether or not the packet data is a packet data which is received firstly among the original files of the packet data "a". When the result of the judgement is that the packet data is not a packet data received firstly, the file-information identification part 22 judges whether or not the file-information of the packet data "a" is already received (STEP S6).

When the file-information is already received, the file-information identification part 22 sends the packet data "a" to the file data identification part 23, before proceeding to processing of the above-described STEP S10.

Further, when the file-information is not received, the file-information identification part 22 judges whether or not the file-information of the original file of the packet data "a" is included in the packet data "a" (STEP S7).

In the result of the above judgement, when the file-information is included in the original file, the step proceeds to the above described STEP S4.

Further, in the result of the above judgement, when the file-information is not included in the original file, the file-information identification part 22 sends the packet data "a" to the file data identification part 23. The file data identification part 23 which receives the packet data "a" judges whether or not it is necessary to rectify the file-size set temporarily According to the position information existing in the packet identification information of the packet data "a" (STEP S8). This judgement is that for instance, size of the packet data is multiplied by value of position in the position information of the packet data. Then, the value thereof is compared with value of the file-size set temporarily, when the file-size set temporarily is smaller than the value thereof, there is judged that the file-size set temporarily is rectified.

In the result of the above judgement, when it is not necessary to rectify the file-size, the file data identification part 23 sends the packet data "a" to a file position identification part 25. Then the step proceeds to STEP S10 described above.

Further, in the result of the above-described judgement, when it is necessary to rectify the file-size, the file data identification part 23 sends te packet data "a" to the temporary file-information setting part 24. The temporary file-information setting part 24 which receives the packet data "a" implements re-setting of the file-size, thus causing content set previously to be stored in the file-information storage part 31 (STEP S9).

Next, the temporary file-information setting part 24 sends the packet data "a" to the file position identification 25. Then the step proceeds to the processing of STEP S10.

Next, there will be described a second embodiment.

Figure 7:
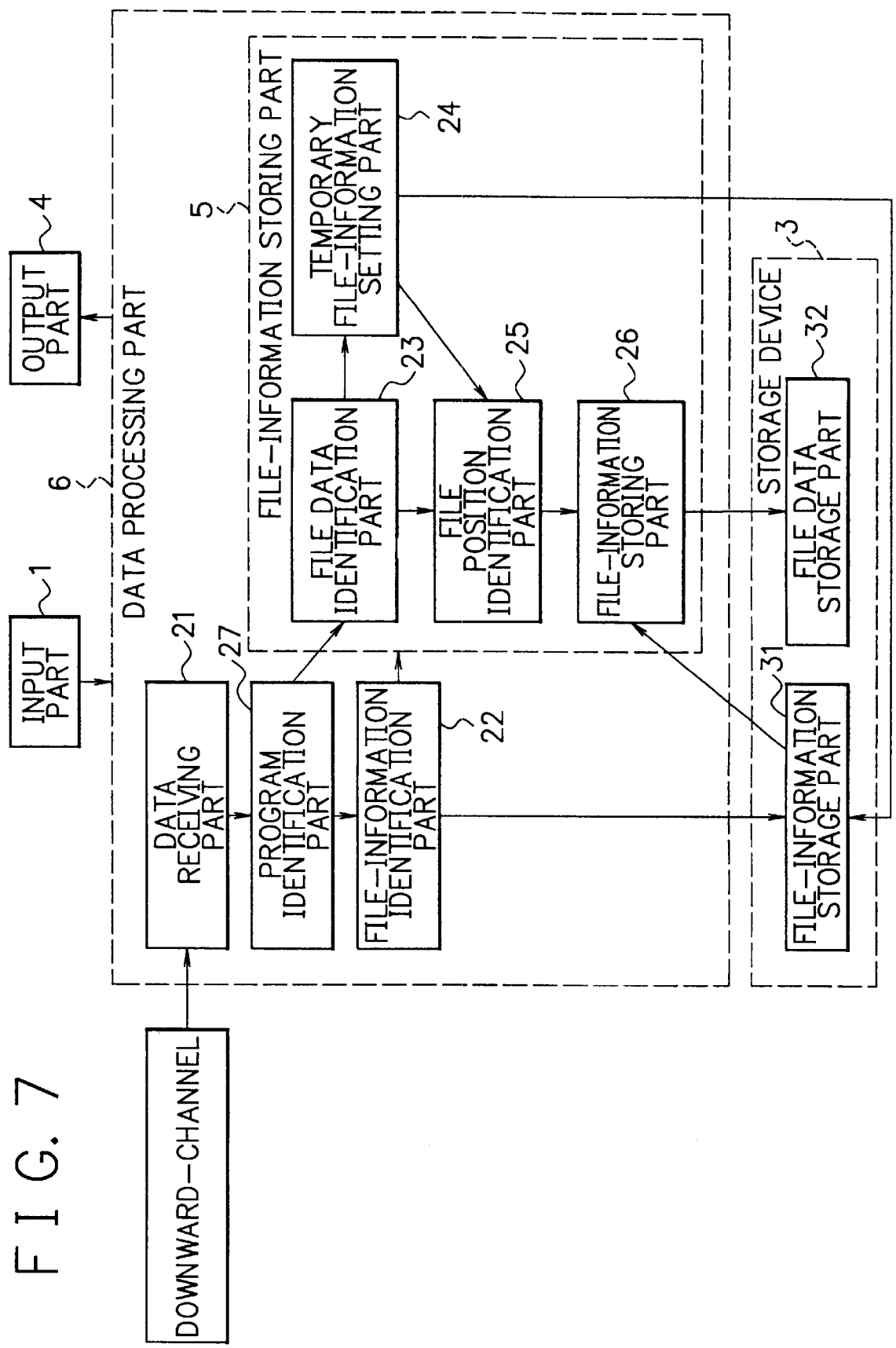
FIG. 7 is a view showing configuration of a second embodiment according to the present invention.

FIG. 7 is a view showing a configuration of the second embodiment.

In FIG. 7, a reference numeral 6 is a data processing part. The data processing part 6 consists of a file-information storing part 5, a data receiving part 21, a file-information identification part 22, and a program identification part 27 describing later.

A reference numeral 3 is a storage device. The storage device 3 consists of a file-information storage part 31 describing later, and a file data storage part 32. The storage device 3 stores therein received file-information and/or file data.

A reference numeral 4 is an output part. The output part 4 is for instance, an output device such as a display, a printer and so forth.

A reference numeral 5 is a file-information storing part. The file-information storing part 5 consists of a file data identification part 23, a temporary file-information setting part 24, file position identification part 25, and a file data storing part 26.

A reference numeral 21 is a data receiving part. The data receiving part 21 which has a communication means receives data sent (broadcasted) from the data sending device (or broadcasting station) through the communication means and the downward-channel.

A reference numeral 23 is a file-information identification part. The file-information identification part 23 identifies the file-information such as file-name of the data to be received and/or file-size from the data received by the data receiving part 21.

A reference numeral 23 is a file data identification part. The file data identification part 23 identifies a file data which should be written using both of data received due to the data receiving part 21 and the file-information received in the file-information identification part 22.

A reference numeral 24 is a temporary file-information setting part. The temporary file-information setting part 24 sets temporary file-name and/or temporary file-size when reception data sent to the file data identification part 23 does not receive a file-information yet.

A reference numeral 25 is a file position identification part. The file position identification part 25 identifies that the reception data corresponds to which part of the file using file-information received from the file-information identification part 22 or the temporary file-information setting part 24.

A reference numeral 26 is a file data storing part. The file data storing part 26 writes the receiving data into the storage device 3. A storing place on that occasion is position of the file received in the file position identification part 25.

A reference numeral 27 is a program identification part. The program identification part 27 judges whether or not the packet data received is included in the program which is intended to receive, when a plurality of files flowing in downward-channel gather into combined unit such as program.

A reference numeral 31 is a file-information storage part. The file-information storage part 31 stores therein file-information which is necessary for writing individual file into a file data storage part 32 describing later, after receiving the individual data such as the file-name of the file which should be received, a storing objective directory name, file-size and so forth.

A reference numeral 32 is a file data storage part. The file data storage part 32 stores therein content of the data which is received actually as a file.

Here, there will be described the program in accordance with FIG. 1. Referring to FIG. 1, FIG. 1 is a format in which a plurality of file-information represented using table system, indicates data when the plurality of file-information are sent as independent data.

Further, in FIG. 1, lateral one line indicates file-information in one file.

In FIG. 1, reference numeral 41 is a program-name. The program-name 41 indicates name of a program. Here, the program consists of a plurality of files. The program indicates a completed meaningful unit. For instance, the program consists of a file of related picture information, a file of speech sound information, and a file of character information.

A reference numeral 42 is identification string. The identification string 42 is a string indicating information for identifying respective files.

A reference numeral 43 is a name string. The name string 43 is a string indicating file-name of respective files.

A reference numeral 44 is a name string. The name string 44 is a string indicating directory name of respective files.

A reference numeral 45 is a size string. The size string 45 is a string indicating file-size of respective files.

Data of the file-information as shown in FIG. 1 consists of n-pieces of file-information from "a a a. t x t" to "0101. d1 1". And this data is sent (broadcasted) from the data sending device (or broadcasting station) as independent data through the downward-channel.

Figure 8:
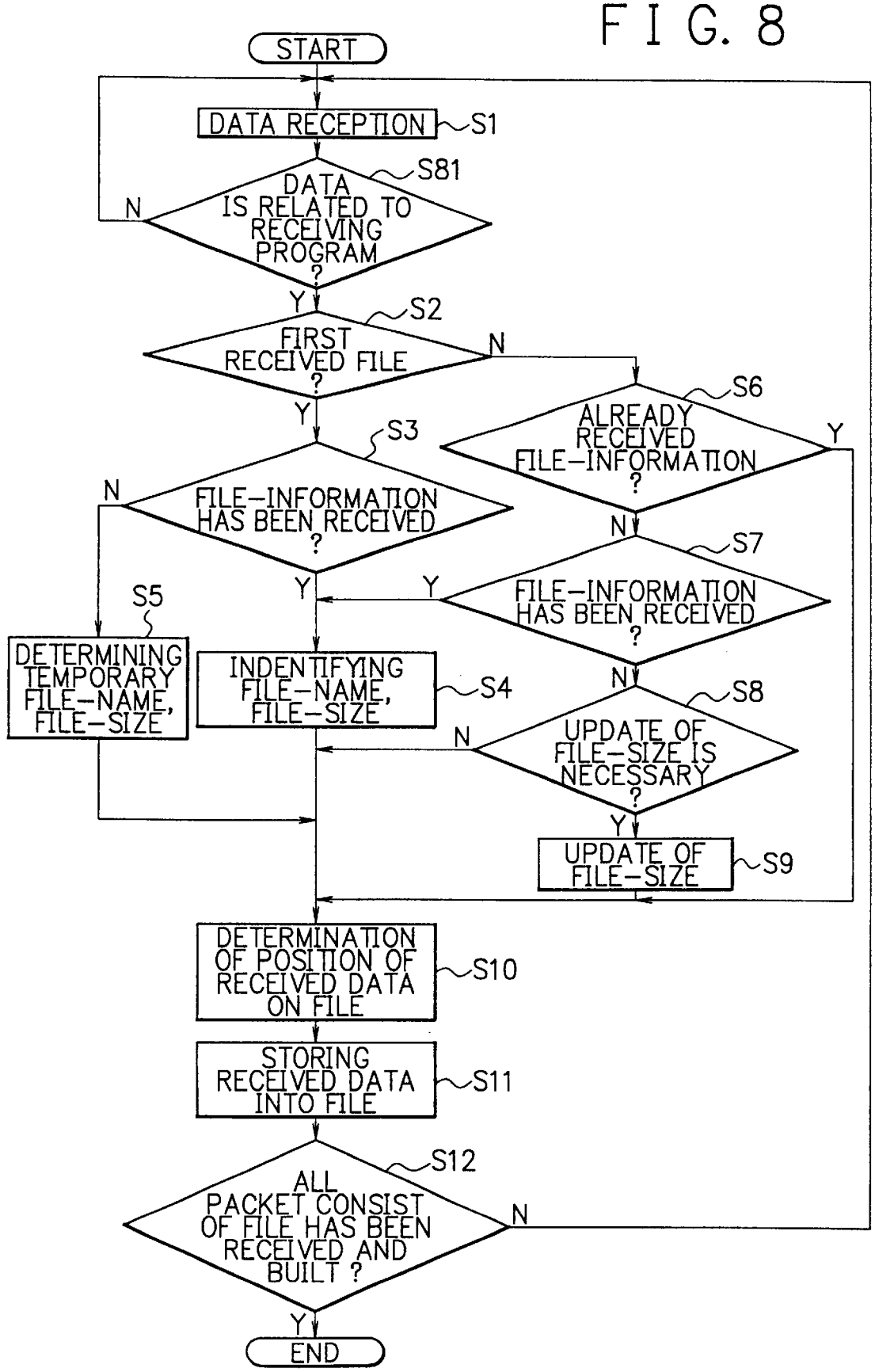
FIG. 8 is a flow chart showing operation of the second embodiment according to the present invention.

Next, there will be described operation of the second embodiment. FIG. 8 is a flowchart showing operation of the second embodiment.

On the supposition that program identification information for identifying the program received currently is already set in the program identification part 27. The setting method is that for instance, the program identification information which the user sets through the input part 1 is stored in the program identification part 27.

Further, on the supposition that packet program identification information for identifying the program is added to the packet data sent from the data sending device (or broadcasting station) through the downward-channel.

Firstly, the data receiving part 21 receives the packet data from the downward-channel (STEP S1).

The data receiving part 21 which receives the packet data sends the packet data to the program identification part 27. The program identification part 27 which receives the packet data judges whether or not the packet data is a packet data which is intended to be received currently according to the program identification information and the packet program identification information of the packet data (STEP S81).

In the result of the above judgement, when the packet data is a packet data of the program which is intended to be received currently, the step proceeds to STEP S2.

Further, in the result of the judgement, when the packet data is not a packet data which is intended to be received currently, the step proceeds to STEP Si.

Then the packet data "a" received by the data receiving part 21 is sent to the file-information identification part 22 subsequently.

The file-information identification part 22 receives the packet data "a". The file-information identification part 22 judges whether or not the packet data "a" is the packet data which is received firstly among the original files (file which is divided to be generated into the packet data "a") of the packet data "a" according both to packet identification information of the packet data "a" and the packet data received previously (STEP S2).

Result of the judgement, when the packet data "a" is the packet data "a" which is received in the first place among the original files of the packet data "a", the file-information identification part 22 judges whether or not it is capable of obtaining file-information concerning the original files of the packet data "a" (STEP S3).

When it is capable of obtaining the file-information, the file-information identification part 22 causes the file-information consisting of the file-name, the storing directory name and the file-size to be stored in the file-information storage part 31 according to the file-information. On this occasion, when the temporary file-name and/or temporary file-size is stored in the file-information storage part 31, the file-information identification part 22 corrects respective temporary data (renewal) to be stored in the file-information storage part 31. Then, the file-information identification part 22 sends data which is necessary for constituting a file toward the file data identification part 23 from the packet data "a". The file data identification part 23 receives data which is necessary for constituting the file from the packet data "a", before sending the data to the file position identification part 25 (STEP S4).

On the other hand, when the file-information can not be obtained, the file-information identification part 22 generates file-information non-obtained information indicating that there is no file-information. Then, the file-information identification part 22 causes the file-information non-obtained information and the packet data "a" to be sent to the file data identification part 23. The file data identification part 23 receives the file-information non-obtained information and the packet data "a", before sending the packet data "a" to a temporary file-information setting part 24.

The temporary information setting part 24 receives the packet data "a", before generating temporary file-name and temporary file-size in terms of the packet data "a". The temporary file-name is a peculiar file-name capable of being identified to another file-name using file identification information and so forth. For instance, on the supposition that file identification information is "A", thus temporary file-name is named as temporary file-name "A".

Further, temporary file-size is set according to position information of the packet data. For instance, temporary file-size is set in such a way that size of the packed data itself is multiplied by value of position (order) of the packet data according to the position information of the packet data. Concretely, on the supposition that the packet data is 128 bytes and the position (order) is "3"(three), temporary file-size is set as being 384 bytes. When it is capable of taking file-size largely, temporary file-size is set value which is further multiplied by the coefficient of safety.

Or, temporary file-size is set in such a way that size of the packet data itself is multiplied by value of position (order) of the packet data according to the position information of the packet data, before the size is set in such a value as a good size to leave off. Concretely, on the supposition that the packet data is 53 bytes and position (order) is 7(seven), thus multiplied value becomes 371 bytes. Thus, file-size is set to 500 bytes which is a good size to leave off. When it is capable of taking file-size largely, temporary file-size is set value which is further multiplied by the coefficient of safety, and then making a file-size a good value to leave off.

Then, the temporary file-information setting part 24 causes information and so forth indicating whether or not temporary file-name, temporary file-size and file-information are received to be stored in the, file-information storage part 31 (STEP S5).

The file position identification part 25 which receives the packet data "a" determines position (order) of the packet data "a" "on the file based on position information existing in the packet identification information of the packet data "a" (STEP S10).

Next, the file position identification part 25 causes the packet data "a" to be sent to a file data storing part 26. Then, the file data storing part 26 which receives the packet data "a" causing the packet data "a" (packet-itself information) to be written file data storage means 32 (STEP 511).

The processing described above is repeated until the file is generated to be completed (STEP S12).

Further, in the above described STEP S2, the file-information identification part 22 judges whether or not the packet data is a packet data which is received firstly among the original files of the packet data "a". When the result of the judgement is that the packet data is not a packet data received firstly, the file-information identification part 22 judges whether or not the file-information of the packet data "a" is already received (STEP S6).

When the file-information is already received, the file-information identification part 22 sends the packet data "a" to the file data identification part 23, before proceeding to processing of the above-described STEP S10.

Further, when the file-information is not received, the file-information identification part 22 judges whether or not the file-information of the original file of the packet data "a" is included in the packet data "a" (STEP S7).

In the result of the above judgement, when the file-information is included in the original file, the step proceeds to the above described STEP S4.

Further, in the result of the above judgement t, when the file-information is not included in the original file, the file-information identification part 22 sends the packet data "a" to the file data identification part 23. The file data identification part 23 which receives the packet data "a" judges whether or not it is necessary to rectify the file-size set temporarily according to the position information existing in the packet identification information of the packet data "a" (STEP S8). This judgement is that for instance, size of the packet data is multiplied by value of position in the position information of the packet data. Then, the value thereof is compared with value of the file-size set temporarily, when the file-size set temporarily is smaller than the value thereof, there is judged that the file-size set temporarily is rectified.

In the result of the above judgement, when it is not necessary to rectify the file-size, the file data identification part 23 sends the packet data "a" to a file position identification part 25. Then the step proceeds to STEP S10 described above.

Further, in the result of the above-described judgement, when it is necessary to rectify the file-size, the file data identification part 23 sends te packet data "a" to the temporary file-information setting part 24. The temporary file-information setting part 24 which receives the packet data "a" implements re-setting of the file-size, thus causing content set previously to be stored in the file-information storage part 31 (STEP S9).

Next, the temporary file-information setting part 24 sends the packet data "a" to the file position identification 25. Then the step proceeds to the processing of STEP S10.

When a plurality of programs flow simultaneously, only necessary data is capable of being written in the file by the program identification part 27, therefore, it is capable of using file material effeciently.

Next, there will be described a third embodiment. FIG. 9 is a view showing a configuration of the third embodiment. An upward-channel is a sending route for sending data from the data receiving device (or picture and/or speech sound receiving device) to the data sending device (or broadcasting station). For this upward-channel, the internet the television, the CATV, or the communication satellite are used therefor.

In FIG. 9, a reference numeral 7 is a data processing part. The data processing part 7 consists of the file-information storing part 5, the data receiving part 21, the file-information identification part 22, and a program requirement part 28. A reference numeral 28 is a program requirement part 28. The program requirement part 28 is provided with a communication means from which the data is sent to the data sending device (or broadcasting station) through the upward-channel. Further, the program requirement part 28 enables the program flowing in the downward-channel to be selected by noticing the program which the user requires reception through the input part 1 to the data sending device (or broadcasting station) through the upward-channel.

A reference numeral 3 is a storage device. The storage device 3 consists of a file-information storage part 31 describing later, and a file data storage part 32. The storage device 3 stores therein received file-information and/or file data.

A reference numeral 4 is an output part. The output part 4 is for instance, an output device such as a display, a printer and so forth.

A reference numeral 5 is a file-information storing part. The file-information storing part 5 consists of a file data identification part 23, a temporary file-information setting part 24, file position identification part 25, and a file data storing part 26.

A reference numeral 21 is a data receiving part. The data receiving part 21 which has a communication means receives data sent (broadcasted) from the data sending device (or broadcasting station) through the communication means and the downward-channel.

A reference numeral 23 is a file-information identification part. The file-information identification part 23 identifies the file-information such as file-name of the data to be received and/or file-size from the data received by the data receiving part 21.

A reference numeral 23 is a file data identification part. The file data identification part 23 identifies a file data which should be written using both of data received due to the data receiving part 21 and the file-information received in the file-information identification part 22.

A reference numeral 24 is a temporary file-information setting part. The temporary file-information setting part 24 sets temporary file-name and/or temporary file-size when reception data sent to the file data identification part 23 does not receive a file-information yet.

A reference numeral 25 is a file position identification part. The file position identification part 25 identifies that the reception data corresponds to which part of the file using file-information received from the file-information identification part 22 or the temporary file-information setting part 24.

A reference numeral 26 is a file data storing part. The file data storing part 26 writes the receiving data into the storage device 3. A storing place on that occasion is position of the file received in the file position identification part 25.

A reference numeral 27 is a program identification part. The program identification part 27 judges whether or not the packet data received is included in the program which is intended to receive, when a.:plurality of files flowing in downward-channel gather into combined unit such as program.

A reference numeral 31 is a file-information storage part. The file-information storage part 31 stores therein file-information which is necessary for writing individual file into a file data storage part 32 describing later, after receiving the individual data such as the file-name of the file which should be received, a storing objective directory name, file-size and so forth.

A reference numeral 32 is a file data storage part. The file data storage part 32 stores therein content of the data which is received actually as a file.

Figure 10:
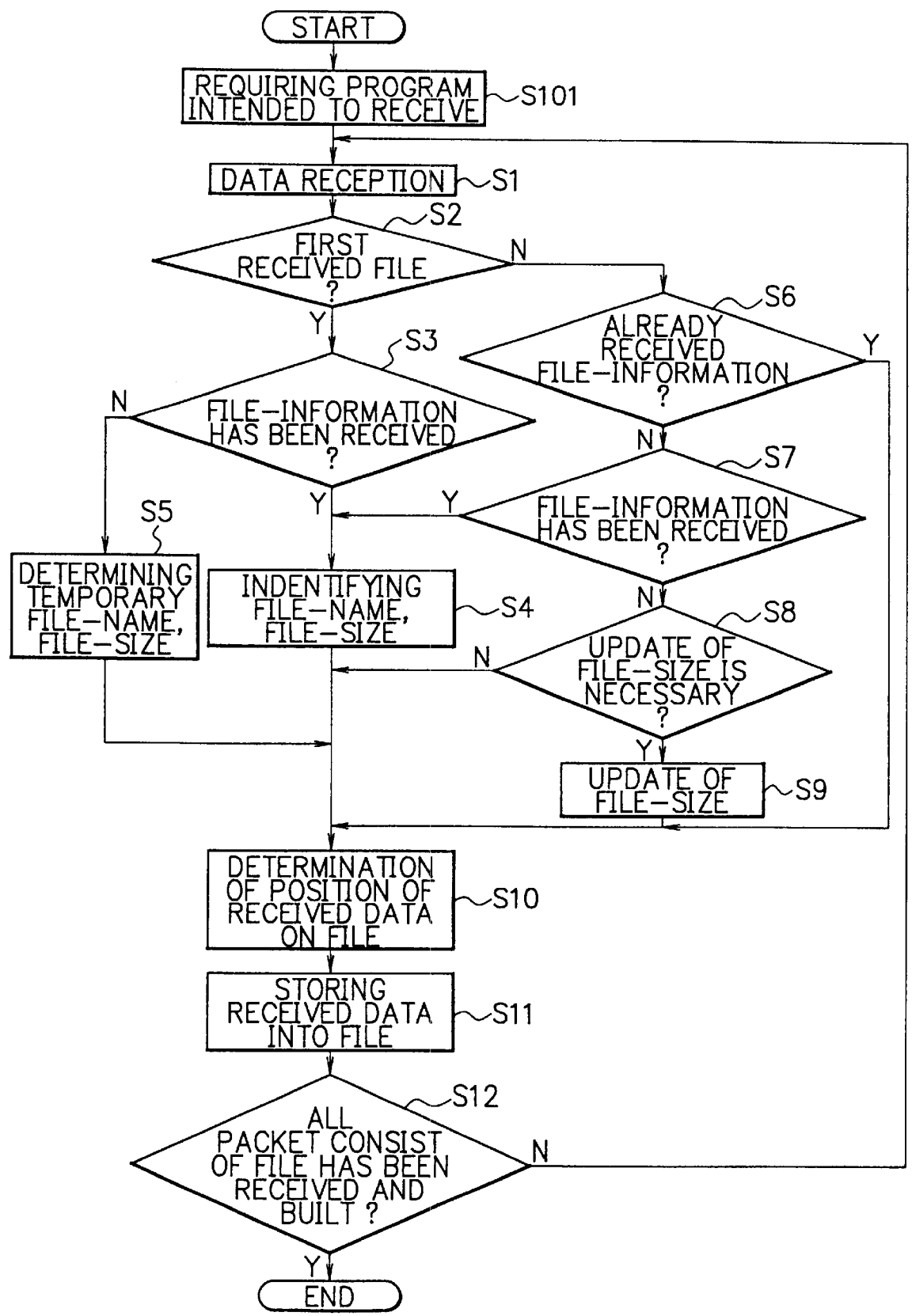
FIG. 10 is a flow chart showing operation of the third embodiment according to the present invention.

Next, there will be described operation of the third embodiment. FIG. 10 is a flowchart showing operation of the third embodiment.

Firstly, the user inputs information of the program requiring reception to the input part 1. The input part 1 inputted thereto the information of the program sends the information of the program to the program requirement part 28. Then, the program requirement part 28 which receives the information of the program sends the information of the program to the data sending device (or the broadcasting station) through the upward-channel.

The sending device (or the broadcasting station) which receives the information of the program sends corresponding file to the information of the program to the downward-channel (STEP S101). Then, the step proceeds STEP S1.

The data receiving part 21 receives the packet data from the downward-channel (STEP S1).

Then the packet data "a" received by the data receiving part 21 is sent to he file-information identification part 22 subsequently.

The file-information identification part 22 receives the packet data "a". The file-information identification part 22 judges whether or not the packet data "a" is the packet data which is received firstly among the original files ( file which is divided to be generated into the packet data "a" ) of the packet data "a" according both to packet identification information of the packet data "a" and the packet data received previously (STEP S2).

Result of the judgement, when the packet data "a" is the packet data "a" which is received in the first place among the original files of the packet data "a", the file-information identification part 22 judges whether or not it is capable of obtaining file-information concerning the original files of the packet data "a" (STEP S3).

When it is capable of obtaining the file-information, the file-information identification part 22 causes the file-information consisting of the file-name, the storing directory name and the file-size to be stored in the file-information storage part 31 according to the file-information. On this occasion, when the temporary file-name and/or temporary file-size is stored in the file-information storage part 31, the file-information identification part 22 corrects respective temporary data (renewal) to be stored in the file-information storage part 31. Then, the file-information identification part 22 sends data which is necessary for constituting a file toward the file data identification part 23 from the packet data "a". The file data identification part 23 receives data which is necessary for constituting the file from the packet data "a", before sending the data to the file position identification part 25 (STEP S4).

On the other hand, when the file-information can not be obtained, the file-information identification part 22 generates file-information non-obtained information indicating that there is no file-information. Then, the file-information identification part 22 causes the file-information non-obtained information and the packet data "a" to be sent to the file data identification part 23. The file data identification part 23 receives the file-information non-obtained information and the packet data "a", before sending the packet data "a" to a temporary file-information setting part 24.

The temporary information setting part 24 receives the packet data "a", before generating temporary file-name and temporary file-size in terms of the packet data "a". The temporary file-name is a peculiar file-name capable of being identified to another file-name using file identification information and so forth. For instance, on the supposition that file identification information is "A", thus temporary file-name is named as temporary file-name "A".

Further, temporary file-size is set according to position information of the packet data. For instance, temporary file-size is set in such a way that size of the packet data itself is multiplied by value of position (order) of the packet data according to the position information of the packet data. Concretely, on the supposition that the packet data is 128 bytes and the position (order) is "3" (three), temporary file-size is set being 384 bytes. When it is capable of taking file-size largely, temporary file-size is set value which is further multiplied by the coefficient of safety. Or, temporary file-size is set in such a way that size of the packet data itself is multiplied by value of position (order) of the packet data according to the position information of the packet data, before the size is set in such a value as a good size to leave off. Concretely, on the supposition that the packet data is 53 byte and position (order) is "7" (seven), thus multiplied value becomes 371 bytes. Thus, file-size is set to 500 bytes which is a good size to leave off. When it is capable of taking file-size largely, temporary file-size is set value which is further multiplied by the coefficient of safety, and then making a file-size a good value to leave off.

Then, the temporary file-information setting part 24 causes information and so forth indicating whether or not temporary file-name, temporary file-size and file-information are received to be stored in the file-information storage part 31 (STEP S5).

The file position identification part 25 which receives the packet data "a" determines position (order) of the packet data "a" on the file based on position information existing in the packet identification information of the packet data "a" (STEP S10).

Next, the file position identification part 25 causes the packet data "a" to be sent to a file data storing part 26. Then, the file data storing part 26 which receives the packet data "a" causing the packet data "a" (packet-itself information) to be written file data storage means 32, (STEP S11).

The processing described above is repeated until the file is generated to be completed (STEP S12).

Further, in the above described STEP" S2, the file-information identification part 22 judges whether or not the packet data is a packet data which is received firstly among the original files of the packet data "a". When the result of the judgement is that the packet data is not a packet data received firstly, the file-information identification part 22 judges whether or not the file-information of the packet data "a" is already received (STEP S6).

When the file-information is already received, the file-information identification part 22 sends the packet data "a" to the, file data identification part 23, before proceeding to processing of the above-described STEP S10.

Further, when the file-information is not received, the file-information identification part 22 judges whether or not the file-information of the original file of the packet data "a" is included in the packet data "a" (STEP S7).

In the result of the above judgement, when the file-information is included in the original file, the step proceeds to the above described STEP S4.

Further, in the result of the above judgement, when the file-information is not included in the original file, the file-information identification part 22 sends the packet data "a" to the file data identification part 23. The file data identification part 23 which receives the packet data "a" judges whether or not it is necessary to rectify the file-size set temporarily according to the position information existing in the packet identification information of the packet data "a" (STEP S8). This judgement is that for instance, size of the packet data is multiplied by value of position in the position information of the packet data. Then, the value thereof is compared with value of the file-size set temporarily, when the file-size set temporarily is smaller than the value thereof, there is judged that the file-size set temporarily is rectified.

In the result of the above judgement, when it is not necessary to rectify the file-size, the file data identification part 23 sends the packet data "a" to a file position identification part 25. Then the step proceeds to STEP S10 described above.

Further, in the result of the above-described judgement, when it is necessary to rectify the file-size, the file data identification part 23 sends to packet data "a" to the temporary file-information setting part 24. The temporary file-information setting part 24 which receives the packet data "a" implements re-setting of the file-size, thus causing content set previously to be stored in the file-information storage part 31 (STEP S9).

Next, the temporary file-information setting part 24 sends the packet data "a" to the file position identification 25. Then the step proceeds to the processing of STEP S10.

The data sending device (or the broadcasting station) which uses the program requirement part 28 is capable of being prevented useless utilization of the downward-channel because the data sending device (or the broadcasting station) sends only the file of the program required by the user.

Figure 11:
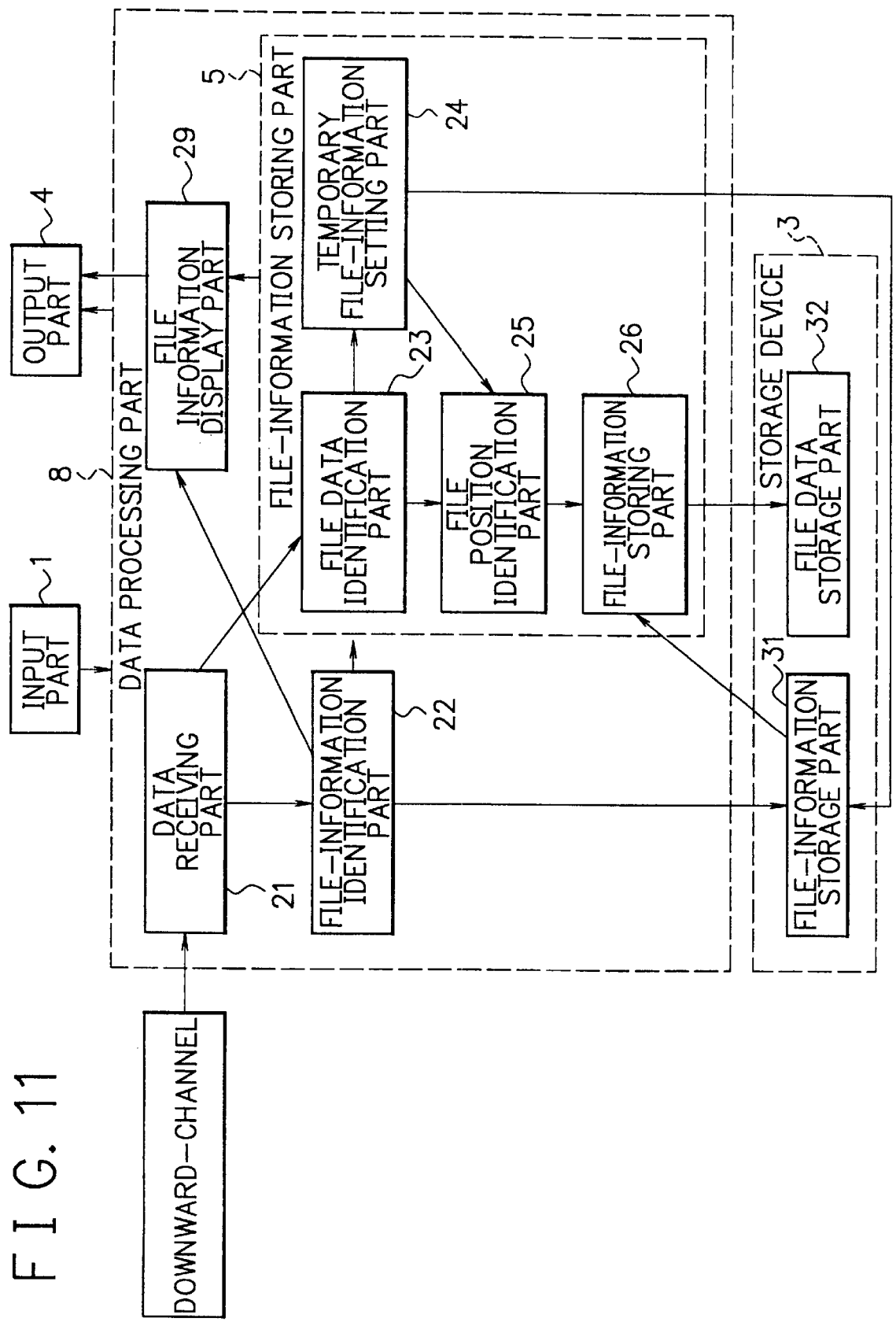
FIG. 11 is a view showing a configurations of a fourth embodiment according to the present invention.

Next, there will be described a fourth embodiment. FIG. 11 is view showing a configuration of fourth embodiment.

In FIG. 11, a reference numeral 8 is data processing part. The data processing part 8 consists of a file-information storing part 5, a file-information identification part 22, and a file-information display part 29.

A reference numeral 29 is the file-information display part. The file-information display part 29 causes information of the progress to be displayed in an output part 4 in every time when the packet data received is written in the storage device 3. The content to be displayed consists of a file-name, a size of file to be received, and ratio of data capable of being received in relation to the file-size.

A reference numeral 3 is a storage device. The storage device 3 consists of a file-information storage part 31 describing later, and a file data storage part 32. The storage device 3 stores therein received file-information and/or file data.

A reference numeral 4 is an output part. The output part 4 is for instance, an output device such as a display, a printer and so forth.

A reference numeral 5 is a file-information storing part. The file-information storing part 5 consists of a file data identification part 23, a temporary file-information setting part 24, file position identification part 25, and a file data storing part 26.

A reference numeral 21 is a data receiving part. The data receiving part 21 which has a communication means receives data sent (broadcasted) from the data sending device (or broadcasting station) through the communication means and the downward-channel.

A reference numeral 23 is a file-information identification part. The file-information identification part 23 identifies the file-information such as file-name of the data to be received and/or file-size from the data received by the data receiving part 21.

A reference numeral 23 is a file data identification part. The file data identification part 23 identifies a file data which should be written using both of data received due to the data receiving part 21 and the file-information received in the file-information identification part 22.

A reference numeral 24 is a temporary file-information setting part. The temporary file-information setting part 24 sets temporary file-name and/or temporary file-size when reception data sent to the file data identification part 23 does not receive a file-information yet.

A reference numeral 25 is a file position identification part. The file position identification part 25 identifies that the reception data corresponds to which part of the file using file-information received from the file-information identification part 22 or the temporary file-information setting part 24.

A reference numeral 26 is a file data storing part. The file data storing part 26 writes the receiving data into the storage device 3. A storing place on that occasion is position of the file received in the file position identification part 25.

A reference numeral 27 is a program identification part. The program identification part 27 judges whether or not the packet data received is included in the program which is intended to receive, when a plurality of files flowing in downward-channel gather into combined unit such as program.

A reference numeral 31 is a file-information storage part. The file-information storage part 31 stores therein file-information which is necessary for writing individual file into a file data storage part 32 describing later, after receiving the individual data such as the file-name of the file which should be received, a storing objective directory name, file-size an d so forth.

A reference numeral 32 is a file data storage part. The file data storage part 32 stores therein content of the data which is received actually as a file.

There is effect that the user easy gets hold of reception condition of the file by using the file-information display part 29.

Figure 12:
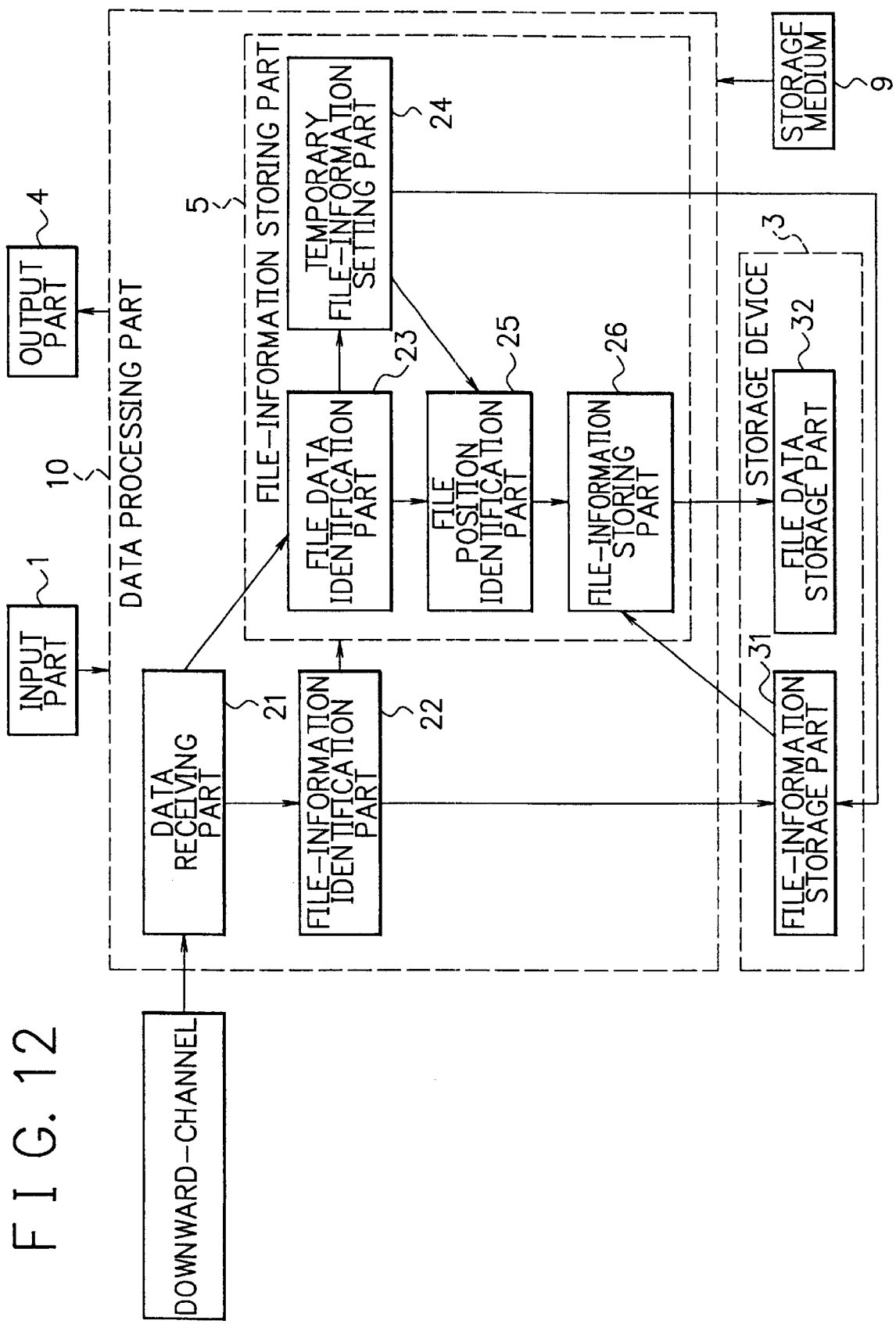
FIG. 12 is a view showing a configuration of a fifth embodiment according to the present invention.

Next, there will be described a fifth embodiment. FIG. 12 is a view showing a configuration of the fifth embodiment.

In FIG. 12, a reference numeral 10 is a data processing part. The data processing part 10 consists of a file-information storing part, a data receiving part 21, and a file-information identification part 22.

A reference numeral 9 is a storage medium. The storage medium 9 is for instance, a magnetic disk and/or a semiconductor memory and so forth. The storage medium 9 stores therein data receiving program for controlling operation of the data processing part 10. The data processing part 10 is provided with a means for reading program stored in the storage medium 9, and a means for executing the program.

A reference numeral 3 is a storage device. The storage device 3 consists of a file-information storage part 31 describing later, and a file data storage part 32. The storage device 3 stores therein received file-information and/or file data.

A reference numeral 4 is an output part. The output part 4 is for instance, an output device such as a display, a printer and so forth.

A reference numeral 5 is a file-information storing part. The file-information storing part 5 consists of a file data identification part 23, a temporary file-information setting part 24, file position identification part 25, and a file data storing part 26.

A reference numeral 21 is a data receiving part. The data receiving part 21 which has a communication means receives data sent (broadcasted) from the data sending device (or broadcasting station) through the communication means and the downward-channel.

A reference numeral 23 is a file-information identification part. The file-information identification part 23 identifies the file-information such as file-name of the data to be received and/or file-size from the data received by the data receiving part 21.

A reference numeral 23 is a file data identification part. The file data identification part 23 identifies a file data which should be written using both of data received due to the data receiving part 21 and the file-information received in the file-information identification part 22.

A reference numeral 24 is a temporary file-information setting part. The temporary file-information setting part 24 sets temporary file-name and/or temporary file-size when reception data sent to the file data identification part 23 does not receive a file-information yet.

A reference numeral 25 is a file position identification part. The file position identification part 25 identifies that the reception data corresponds to which part of the file using file-information received from the file-information identification part 22 or the temporary file-information setting part 24.

A reference numeral 26 is a file data storing part. The file data storing part 26 writes the receiving data into the storage device 3. A storing place on that occasion is position of the file received in the file position identification part 25.

A reference numeral 27 is a program identification part. The program identification part 27 judges whether or not the packet data received is included in the program which is intended to receive, when a plurality of files flowing in downward-channel gather into combined unit such as program.

A reference numeral 31 is a file-information storage part. The file-information storage part 31 stores therein file-information which is necessary for writing individual file into a file data storage part 32 describing later, after receiving the individual data such as the file-name of the file which should be received, a storing objective directory name, file-size and so forth.

A reference numeral 32 is a file data storage part. The file data storage part 32 stores therein content of the data which is received actually as a file.

Next, there will be described operation of the fifth embodiment.

Firstly, the data processing device 10 reads a data reception program from the storage medium 9. Then, the data processing device 10 implements processing of the data reception program.

The data processing device 10 enables the same processing as the processing according to the data processing devices 2, 6, 7, and 8 to be executed in the first to the fourth embodiments by executing control (processing) of the data reception program.

As described above, according to the present invention, it is capable of receiving file data which is read without reading to be discarded. Consequently, it is capable of reducing reception time of the file.

The reason why, even though the data whose file-name, and/or file-size is unknown is received, the temporary file-information setting part (means) receives to be implemented storing of the file as effective data while determining temporary file-name and/or temporary file-size, therefore, there does not occur throwing data away after a single reading corresponds to preliminary exhibition of data by way of experiment.

While preferred embodiments of the invention have been described using specific terms, such description is for illustrative purpose only, and it is to be understood that changes and variations may be made without departing from the spirit or scope of the following claims.

What is claimed is:

1. A data sending/receiving system comprising:
   a data sending device including a means which causes a sending file to be converted into packet data, before adding file identification information to every respective packets in order to identify said file, and a means for adding position information indicating a position in relation to said file of the packet data in every respective packets; and
   a data receiving device including a storage means, a means for generating temporary file-information according to said file identification information, a means for storing said packet data in said storage means associated with said temporary file-information, and a means for generating temporary file-size according to said position information before adding said temporary file-size to said temporary file-information.

2. A data receiving device in which when a data sending device converts a file to be sent into packet data, file identification information of said file is added to respective packet and position information in relation to said file of the packet data is added, before the data receiving device receives packet data sent through downward-channel, comprising:
   a storage device;
   a means for generating temporary file-information according to said file identification information;
   a means for causing said packet data to be stored in said storage device associated with temporary file-information; and
   a means for generating temporary file-size according to said position information, and for adding said file-size to said temporary file-information.

3. A data receiving device in which when a data sending device converts a file to send into a packet data, said data sending device adds file-information regarding said file to any of packets, and said data receiving device receives said packet data to which file identification information for identifying said file and position information of the packet data in relation to said file in every respective packets exception for the file-information regarding said file to be sent through downward-channel, comprising:
   a storage device;
   a data receiving means for receiving data through said downward-channel;
   a file-information identification means which judges whether or not said file-information of data has been received, outputting non-reception information of file-information indicating that there is no file-information when the file-information is not received in the result of the above judgement; and
   a file-information storing means in which when said file-information storing means receives said file-information non-reception information, said file-information storing means generates temporary file-information according to said file identification information and generates temporary file-size according to said position information, before securing storage area for storing said data in said storage device based on said temporary file-size, thus causing said data to be stored in said storage device associated with said temporary file-information.

4. A data receiving device as claimed in claim 3, wherein said data receiving device further includes input means.

5. A data receiving device as claimed in claim 3, wherein said data receiving device further includes output means.

6. A data receiving device as claimed in claim 4, wherein said data receiving device further includes output means.

7. A data receiving device as claimed in claim 3, wherein said file-information storing means comprises:
   a temporary file-information setting means for generating temporary file-information consisting of a temporary file-name of said data, and a temporary file-size according to file identification information and position information of data received in data receiving means;
   a file data identification means for generating storing objective file identification information which indicates identification of file to be written said data in said storage device according to said data and said temporary file-information;
   a file position identification means for; generating file position information indicating information of the position in relation to file for writing said data into said storage device according to said position information of the data; and
   a file data storing means for storing said data in said storing means according to said temporary file identification information, said storing objective file identification information, and said file position information.

8. A data receiving device as claimed in claim,6, wherein said file-information storing means comprises:
   a temporary file-information setting means for generating temporary file-information consisting of a temporary file-name of said data, and a temporary file-size according to file identification information and position information of data received in data receiving means;
   a file data identification means for generating storing objective file identification information which indicates identification of file to be written said data in said storage device according to said data and said temporary file-information;
   a file position identification means for generating file position information indicating information of the position in relation to file for writing said data into said storage device according to said position information of the data; and
   a file data storing means for storing said data in said storing means according to said temporary file identification information, said storing objective file identification information, and said file position information.

9. A data receiving device as claimed in claim 5, wherein said file-information storing means comprises:
   a temporary file-information setting means for generating temporary file-information consisting of a temporary file-name of said data, and a temporary file-size according to file identification information and position information of data received in data receiving means;
   a file data identification means for generating storing objective file identification information which indicates identification of file to be written said data in said storage device according to said data and said temporary file-information;

a file position identification means for generating file position information indicating information of the position in relation to file for writing said data into said storage device according to said position information of the data; and a file data storing means for storing said data in said storing means according to said temporary file identification information, said storing objective file identification information, and said file position information.

10. A data receiving device as claimed in claim 3, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

11. A data receiving device as claimed in claim 4, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

12. A data receiving device as claimed in claim 5, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

13. A data receiving device as claimed in claim 6, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

14. A data receiving device as claimed in claim 7, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

15. A data receiving device as claimed in claim 8, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

16. A data receiving device as claimed in claim 9, wherein said storage device comprises:

a file-information storage means for storing therein file-information consisting of information of file-name, information of directory-name, and information of file-size; and a file data storage means for causing necessary data for a file in which said data is restored to its original state to be stored as a file from the data received by the data receiving means.

17. A data receiving device as claimed in claim 3, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

18. A data receiving device as claimed in claim 4, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

19. A data receiving device as claimed in claim 5, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

20. A data receiving device as claimed in claim 6, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

21. A data receiving device as claimed in claim 7, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

22. A data receiving device as claimed in claim 8, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

23. A data receiving device as claimed in claim 9, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

24. A data receiving device as claimed in claim 10, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

25. A data receiving device as claimed in claim 13, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

26. A data receiving device as claimed in claim 12, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

27. A data receiving device as claimed in claim 13, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

28. A data receiving device as claimed in claim 14, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

29. A data receiving device as claimed in claim 15, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

30. A data receiving device as claimed in claim 16, wherein a program to be sent consists of file whose number is one or more than two, and said data receiving device further comprises a program identification means which judges whether or not data received by the data receiving means is data converted into packet data from file consisting of required program, under the result of the judgement, when the data is not data which is converted into the packet data from the file consisting of the required program, said program identification means discards said data.

31. A data receiving device as claimed in claim 3, wherein a program to be sent consists of file whose number is one or more than two, and said data receiving means further comprises a program requirement means for sending information of the program required through the input means to a sending device.

32. A data receiving device as claimed in claim 4, wherein a program to be sent consists of file whose number is one or more than two, and said data receiving means further comprises a program requirement means for sending information of the program required through the input means to a sending device.

33. A data receiving device as claimed in claim 5, wherein a program to be sent consists of file whose number is one or more than two, and said data receiving means further comprises a program requirement means for sending information of the program required through the input means to a sending device.

34. A data receiving device as claimed in aim 6, wherein a program to be sent consists of file whose number is one or more than two, and said data receiving means further comprises a program requirement means for sending information of the program required through the input means to a sending device.

35. A data receiving device as claimed in claim 7, wherein a program to be sent consists of file whose number is one or more than two, and said data receiving means further comprises a program requirement means for sending information of the program required through the input means to a sending device.

36. A data receiving device as claimed in claim 6, wherein a program to be sent consists of file whose number is one or more than two, and said data receiving means further comprises a program requirement means for sending information of the program required through the input means to a sending device.

37. A data receiving device as claimed in claim 9, wherein a program to be sent consists of file whose number is one or more than two, and said data receiving means further comprises a program requirement means for sending information of the program required through the input means to a sending device.

38. A data receiving device as claimed in claim 10, wherein a program to be sent consists of file whose number is one or more than two, and said data receiving means further comprises a program requirement means for sending information of the program required through the input means to a sending device.

39. A data receiving device as claimed in claim 11, wherein a program to be sent consists of file whose number is one or more than two, and said data receiving means further comprises a program requirement means for sending information of the program required through the input means to a sending device.

40. A data receiving device as claimed in claim 12, wherein a program to be sent consists of file whose number is one or more than two, and said data receiving means further comprises a program requirement means for sending information of the program required through the input means to a sending device.

41. A data receiving device as claimed in claim 13, wherein a program to be sent consists of file whose number is one or more than two, and said data receiving means further comprises a program requirement means for sending information of the program required through the input means to a sending device.

42. A data receiving device as claimed in claim 14, wherein a program to be sent consists of file whose number is one or more than two, and said data receiving means further comprises a program requirement means for sending information of the program required through the input means to a sending device.

43. A data receiving device as claimed in claim 15, wherein a program to be sent consists of file whose number is one or more than two, and said data receiving means further comprises a program requirement means for sending information of the program required through the input means to a sending device.

44. A data receiving device as claimed in claim 16, wherein a program to be sent consists of file whose number is one or more than two, and said data receiving means further comprises a program requirement means for sending information of the program required through the input means to a sending device.

45. A data receiving device as claimed in claim 17, wherein a program to be sent consists of file whose number is one or more than two, and said data receiving means further comprises a program requirement means for sending information of the program required through the input means to a sending device.

46. A data receiving device as claimed in claim 18, wherein a program to be sent consists of file whose number is one or more than two, and said data receiving means further comprises a program requirement means for sending information of the program required through the input means to a sending device.

47. A data receiving device as claimed in claim 19, wherein a program to be sent consists of file whose number is one or more than two, and said data receiving means further comprises a program requirement means for sending information of the program required through the input means to a sending device.

48. A data receiving device as claimed in claim 20, wherein a program to be sent consists of file whose number is one or more than two, and said data receiving means further comprises a program requirement means for sending information of the program required through the input means to a sending device.

49. A data receiving device as claimed in claim 21, wherein a program to be sent consists of file whose number is one or more than two, and said data receiving means further comprises a program requirement means for sending information of the program required through the input means to a sending device.

50. A data receiving device as claimed in claim 22, wherein a program to be sent consists of file whose number is one or more than two, and said data receiving means further comprises a program requirement means for sending information of the program required through the input means to a sending device.

51. A data receiving device as claimed in claim 23, wherein a program to be sent consists of file whose number is one or more than two, and said data receiving means further comprises a program requirement means for sending information of the program required through the input means to a sending device.

52. A data receiving device as claimed in claim 24, wherein a program to be sent consists of file whose number is one or more than two, and said data receiving means further comprises a program requirement means for sending information of the program required through the input means to a sending device.

53. A data receiving device as claimed in claim 25, wherein a program to be sent consists of file whose number is one or more than two, and said data receiving means further comprises a program requirement means for sending information of the program required through the input means to a sending device.

54. A data receiving device as claimed in claim 26, wherein a program to be sent consists of file whose number is one or more than two, and said data receiving means further comprises a program requirement means for sending information of the program required through the input means to a sending device.

55. A data receiving device as claimed in claim 27, wherein a program to be sent consists of file whose number is one or more than two, and said data receiving means further comprises a program requirement means for sending information of the program required through the input means to a sending device.

56. A data receiving device as claimed in claim 28, wherein a program to be sent consists of file whose number is one or more than two, and said data receiving means further comprises a program requirement means for sending information of the program required through the input means to a sending device.

57. A data receiving device as claimed in claim 29, wherein a program to be sent consists of file whose number is one or more than two, and said data receiving means further comprises a program requirement means for sending information of the program required through the input means to a sending device.

58. A data receiving device as claimed in claim 30, wherein a program to be sent consists of file whose number is one or more than two, and said data receiving means further comprises a program requirement means for sending information of the program required through the input means to a sending device.

59. A data receiving device as claimed in claim 3, wherein said data receiving device further comprises a file-information display means which causes information of receiving status to be displayed when said data receiving device causes data received by said data receiving means to be stored in said storage device.

60. A data receiving device as claimed in claim 4, wherein said data receiving device further comprises a file-information display means which causes information of receiving status to be displayed when said data receiving device causes data received by said data receiving means to be stored in said storage device.

61. A data receiving device as claimed in claim 5, wherein said data receiving device further comprises a file-information display means which causes information of receiving status to be displayed when said data receiving device causes data received by said data receiving means to be stored in said storage device.

62. A data receiving device as claimed in claim 7, wherein said data receiving device further comprises a file-information display means which causes information of receiving status to be displayed when said data receiving device causes data received by said data receiving means to be stored in said storage device.

63. A data receiving device as claimed in claim 10, wherein said data receiving device further comprises a file-information display means which causes information of receiving status to be displayed when said data receiving device causes data received by said data receiving means to be stored in said storage device.

64. A data receiving device as claimed in claim 17, wherein said data receiving device further comprises a file-information display means which causes information of receiving status to be displayed when said data receiving device causes data received by said data receiving means to be stored in said storage device.

65. A data receiving device as claimed in claim 31, wherein said data receiving device further comprises a file-information display means which causes information of receiving status to be displayed when said data receiving device causes data received by said data receiving means to be stored in said storage device.

66. A data receiving device as claimed in claim 3, wherein said data receiving device has a storage medium recorded therein a program which causes said data receiving device to function as said data receiving means, said file-information identification means, and/or said file-information storing means.

67. A data receiving device as claimed in claims 4, wherein said data receiving device has a storage medium recorded therein a program which causes said data receiving device to function as said data receiving means, said file-information identification means, and/or said file-information storing means.

68. A data receiving device as claimed in claim 5, wherein said data receiving device has a storage medium recorded therein a program which causes said data receiving device to function as said data receiving means, said file-information identification means, and/or said file-information storing means.

69. A data receiving device as claimed in claim 7, wherein said data receiving device has a storage medium recorded therein a program which causes said data receiving device to function as said data receiving means, said file-information identification means, and/or said file-information storing means.

70. A data receiving device as claimed in claim 10, wherein said data receiving device has a storage medium recorded therein a program which causes said data receiving device to function as said data receiving means, said file-information identification means, and/or said file-information storing means.

71. A data receiving device as claimed in claim 17, wherein said data receiving device has a storage medium recorded therein a program which causes said data receiving device to function as said data receiving means, said file-information identification means, and/or said file-information storing means.

72. A data receiving device as claimed in claim 31, wherein said data receiving device has a storage medium recorded therein a program which causes said data receiving device to function as said data receiving means, said file-information identification means, and/or said file-information storing means.

73. A data receiving device as claimed in claim 59, wherein said data receiving device has a storage medium recorded therein a program which causes said data receiving device to function as said data receiving means, said file-information identification means, and/or said file-information storing means.

74. A data receiving method in which when a data sending method converts a file to send into a packet data, said data sending method adds file-information regarding said file to any of packets and adds position information in relation to said file of the packet data, and said data receiving method receives said packet data to which file identification information for identifying said file and position information of the packet data in relation to said file in every respective packets exception for the file-information regarding said file to be sent through a downward-channel, comprising the steps of:
  generating temporary file-information based on file identification information which is added individually to respective packets when it is incapable of acquiring said file-information on the occasion of reception of said data; generating temporary file-size according to said position information and adding said file-size to said temporary file-information; and
  storing received data based on said temporary file-information.

75. A data receiving method as claimed in claim 74, wherein a program to be sent consists of file whose number is one or more than two, and said data receiving method further comprises a step for discarding said data when received data is not data of file consisting of required program.

76. A data receiving method as claimed in claim 74, wherein a program to be sent consists of file whose number is one or more than two, and said data receiving method further comprises the steps of:
  inputting said program; and
  sending information of the program inputted therein to sending device.

77. A data receiving method as claimed in claim 75, wherein a program to be sent of file whose number is one or more than two, and said data receiving method further comprises the steps of:
  inputting said program; and
  sending information of the program inputted therein to sending device.

78. A data receiving method as claimed in claim 74, wherein said data receiving method further comprises the steps of:
  storing therein data received by data receiving process; and
  causing information of said receiving status to be outputted and displayed.

79. A data receiving method as claimed in claim 75, wherein said data receiving method further comprises the steps of:
  storing therein data received by data receiving process; and
  causing information of said receiving status to be outputted and displayed.

80. A data receiving method as claimed in claim 76, wherein said data receiving method further comprises the steps of:
  storing therein data received by data receiving process; and
  causing information of said receiving status to be outputted and displayed.

* * * * *